US011341272B2

(12) United States Patent
Sullivan et al.

(10) Patent No.: US 11,341,272 B2
(45) Date of Patent: May 24, 2022

(54) METHODS AND APPARATUS TO ASSIGN DEMOGRAPHIC INFORMATION TO PANELISTS

(71) Applicant: The Nielsen Company (US), LLC, New York, NY (US)

(72) Inventors: Jonathan Sullivan, Hurricane, UT (US); Shelli Kashriel, New York, NY (US); Michelle Christian, Oldsmar, FL (US); ChoongKoo Lee, San Jose, CA (US)

(73) Assignee: The Nielsen Company (US), LLC, New York, NY (US)

( * ) Notice: Subject to any disclaimer, the term of this patent is extended or adjusted under 35 U.S.C. 154(b) by 166 days.

(21) Appl. No.: 16/895,892

(22) Filed: Jun. 8, 2020

(65) Prior Publication Data

US 2020/0372181 A1    Nov. 26, 2020

Related U.S. Application Data

(63) Continuation of application No. 16/371,976, filed on Apr. 1, 2019, now Pat. No. 10,691,831, which is a
(Continued)

(51) Int. Cl.
*G06F 21/62*      (2013.01)
*G06Q 30/02*      (2012.01)
*G06F 16/2457*    (2019.01)

(52) U.S. Cl.
CPC ...... *G06F 21/6254* (2013.01); *G06F 16/2457* (2019.01); *G06Q 30/0204* (2013.01)

(58) Field of Classification Search
CPC ............ G06F 21/6254; G06F 16/2457; G06Q 30/0204
See application file for complete search history.

(56) References Cited

U.S. PATENT DOCUMENTS 7,139,723 B2    11/2006   Conkwright et al.
8,009,863 B1    8/2011    Sharma et al.
(Continued)

OTHER PUBLICATIONS

United States Patent and Trademark Office, "Non-Final Office Action", issued in connection with U.S. Appl. No. 14/864,300, dated May 17, 2017, 8 pages.
(Continued)

*Primary Examiner* — Chau Le
(74) *Attorney, Agent, or Firm* — Hanley, Flight & Zimmerman, LLC

(57) ABSTRACT

Methods and apparatus to assign demographic information to panelists are disclosed. An example disclosed apparatus disclosed herein includes a database proprietor identifier (DPID) extractor to extract a panelist database proprietor identifier from a cookie, the panelist database proprietor identifier associated with credentials used by a panelist to access a website. The example apparatus further includes a collector to send a message to a first server of an audience measurement entity, the message including the panelist database proprietor identifier and a panelist identifier associated with the panelist, the panelist database proprietor identifier to be distributed with decoy database proprietor identifiers in a query to a second server at a database proprietor to obtain demographic information, the decoy database proprietor identifiers determined based on a probability density function so that a quantity of the decoy database proprietor identifiers is less than would be used if the decoy database proprietor identifiers were selected by a random selection process, the panelist identifier to be used to associate the panelist with a portion of the demographic information.

20 Claims, 8 Drawing Sheets

Related U.S. Application Data continuation of application No. 15/864,893, filed on Jan. 8, 2018, now Pat. No. 10,248,811, which is a continuation of application No. 14/864,300, filed on Sep. 24, 2015, now Pat. No. 9,870,486.

(60) Provisional application No. 62/167,820, filed on May 28, 2015.

(56) References Cited

U.S. PATENT DOCUMENTS

| | | | |
|---|---|---|---|
| 9,237,138 B2 | 1/2016 | Bosworth et al. | |
| 9,313,294 B2* | 4/2016 | Perez | H04L 67/02 |
| 9,497,090 B2 | 11/2016 | Srivastava et al. | |
| 9,697,533 B2 | 7/2017 | Alla et al. | |
| 9,870,486 B2 | 1/2018 | Sullivan et al. | |
| 10,037,546 B1* | 7/2018 | Benisch | G06Q 30/0248 |
| 10,248,811 B2 | 4/2019 | Sullivan et al. | |
| 10,691,831 B2 | 6/2020 | Sullivan et al. | |
| 2002/0087967 A1 | 7/2002 | Conkwright et al. | |
| 2004/0015714 A1 | 1/2004 | Abraham et al. | |
| 2004/0193488 A1 | 9/2004 | Khoo et al. | |
| 2005/0256755 A1 | 11/2005 | Chand et al. | |
| 2007/0219985 A1* | 9/2007 | Aravamudan | G06F 16/335 |
| 2008/0319834 A1 | 12/2008 | Miller et al. | |
| 2010/0262498 A1* | 10/2010 | Nolet | G06Q 30/0276 |
| | | | 705/14.71 |
| 2010/0313009 A1 | 12/2010 | Combet et al. | |
| 2012/0072469 A1* | 3/2012 | Perez | G06Q 10/067 |
| | | | 707/810 |
| 2012/0072939 A1 | 3/2012 | Crenshaw | |
| 2013/0024879 A1 | 1/2013 | Bruich et al. | |
| 2013/0290070 A1 | 10/2013 | Abraham et al. | |
| 2013/0325583 A1 | 12/2013 | Arini et al. | |
| 2013/0332604 A1 | 12/2013 | Seth et al. | |
| 2014/0337104 A1 | 11/2014 | Splaine et al. | |
| 2015/0081604 A1 | 3/2015 | Duque et al. | |
| 2015/0262207 A1 | 9/2015 | Rao et al. | |
| 2016/0191970 A1 | 6/2016 | Sheppard et al. | |
| 2017/0127133 A1 | 5/2017 | Sullivan et al. | |
| 2020/0202370 A1* | 6/2020 | Sheppard | G06Q 30/0204 |

OTHER PUBLICATIONS

United States Patent and Trademark Office, "Notice of Allowance", issued in connection with U.S. Appl. No. 14/864,300, dated Sep. 11, 2017, 8 pages.

United States Patent and Trademark Office, "Non-final Office Action", issued in connection with U.S. Appl. No. 15/864,893, dated Apr. 4, 2018, 9 pages.

United States Patent and Trademark Office, "Final Office Action", issued in connection with U.S. Appl. No. 15/864,893, dated Sep. 4, 2018, 6 pages.

United States Patent and Trademark Office, "Non Final Office Action", issued in connection with U.S. Appl. No. 16/371,976 dated Sep. 25, 2019, 7 pages.

United States Patent and Trademark Office, "Notice of Allowance and Fee(s) Due", issued in connection with U.S. Appl. No. 16/371,976 dated Feb. 13, 2020, 8 pages.

United States Patent and Trademark Office, "Notice of Allowance and Fee(s) Due," issued in connection with U.S. Appl. No. 15/864,893 dated Nov. 20, 2018, 7 pages.

* cited by examiner

| | | |
|---|---|---|
| 112a | PDPID | 54688798112414 |
| 122a | DDPID | 16248584114994 |
| 122b | DDPID | 08132206409893 |
| 122c | DDPID | 92978171474387 |
| 122d | DDPID | 69354480637859 |
| 112b | PDPID | 42154196564601 |
| 112c | PDPID | 47293148531245 |
| 122e | DDPID | 14752969359297 |
| 112d | PDPID | 95992427607504 |
| 122f | DDPID | 00606557762950 |
| 122g | DDPID | 19724973985276 |
| ⋮ | ⋮ | ⋮ |
| 122h | DDPID | 51937672386243 |

METHODS AND APPARATUS TO ASSIGN DEMOGRAPHIC INFORMATION TO PANELISTS

RELATED APPLICATIONS

This patent arises from a continuation of U.S. patent application Ser. No. 16/371,976, filed Apr. 1, 2019, which is a continuation of U.S. patent application Ser. No. 15/864,893, filed Jan. 8, 2018, now U.S. Pat. No. 10,248,811, which is a continuation of U.S. patent application Ser. No. 14/864,300, filed Sep. 24, 2015, now U.S. Pat. No. 9,870,486, which claims the benefit under 35 U.S.C. § 119(e), of U.S. Provisional Application Ser. No. 62/167,820, filed May 28, 2015. U.S. patent application Ser. No. 16/371,976, U.S. patent application Ser. No. 15/864,893, U.S. patent application Ser. No. 14/864,300, and U.S. Provisional Application Ser. No. 62/167,820 are hereby incorporated herein by reference in their entireties. Priority to U.S. patent application Ser. No. 16/371,976, U.S. patent application Ser. No. 15/864,893, U.S. patent application Ser. No. 14/864,300 and U.S. Provisional Application Ser. No. 62/167,820 is claimed.

FIELD OF THE DISCLOSURE

This disclosure relates generally to audience measurement and, more particularly, to methods and apparatus to assign demographic information to panelists.

BACKGROUND

Audience measurement entities measure exposure of audiences to media such as television, music, movies, radio, Internet websites, streaming media, etc. The audience measurement entities generate ratings based on the measured exposure. Ratings are used by advertisers and/or marketers to purchase advertising space and/or design advertising campaigns. Additionally, media producers and/or distributors use the ratings to deter mine how to set prices for advertising space and/or to make programming decisions.

Techniques for monitoring user access media have evolved significantly over the years. Some prior systems perform such monitoring primarily through server logs. In particular, entities serving media on the Internet can use such prior systems to log the number of requests received for their media at their server.

BRIEF DESCRIPTION OF THE DRAWINGS

FIG. 3 illustrates example database proprietor identifiers and example decoy database proprietor identifiers used by the example demographic retriever of FIG. 1 to retrieve panelist demographic information from the example database proprietor of FIG. 1.

DETAILED DESCRIPTION

Figure 1:
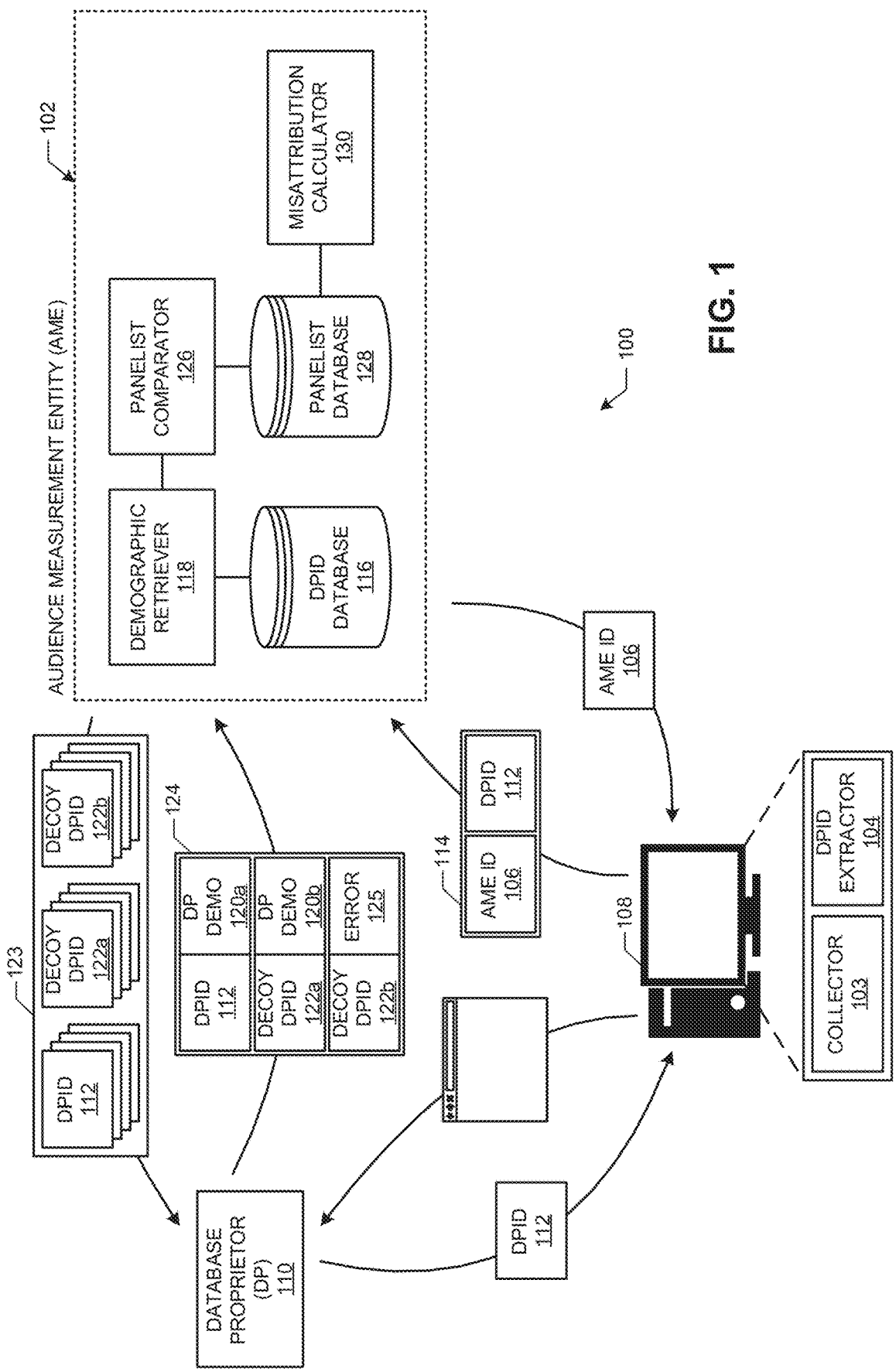
FIG. 1 illustrates an example system to assign demographic information to panelists.

Examples disclosed herein may be used to assign a database proprietor identifier to a member of a panelist household. To measure audiences, an audience measurement entity (AME) may use instructions (e.g., Java, java script, or any other computer language or script) embedded in media to collect information indicating when audience members are accessing media on a computing device (e.g., a computer, a laptop, a smartphone, a tablet, etc.). Media to be traced is tagged with these instructions. When a device requests the media, both the media and the instructions are downloaded to the client. The instructions cause information about the media access to be sent from the device to a monitoring entity (e.g., the AME). Examples of tagging media and tracing media through these instructions are disclosed in U.S. Pat. No. 6,108,637, issued Aug. 22, 2000, entitled "Content Display Monitor," which is incorporated by reference in its entirety herein.

Additionally, the instructions cause one or more user and/or device identifiers (e.g., an international mobile equipment identity (IMEI), a mobile equipment identifier (MEID), a media access control (MAC) address, an app store identifier, an open source unique device identifier (OpenUDID), an open device identification number (ODIN), a login identifier, a username, an email address, user agent data, third-party service identifiers, web storage data, document object model (DOM) storage data, local shared objects also referred to as "Flash cookies"), browser cookies, an automobile vehicle identification number (VIN), etc.) located on the computing device to be sent to a partnered database proprietor (e.g., Facebook, Twitter, Google, Yahoo!, MSN, Apple, Experian, etc.) to identify demographic information (e.g., age, gender, geographic location, race, income level, education level, religion, etc.) for the audience member of the computing device collected via a user registration process. For example, an audience member may be viewing an episode of "Modern Family" in a media streaming app on a tablet device. In that instance, in response to instructions executing within the app, a user/device identifier stored on the tablet device is sent to the AME and/or a partner database proprietor to associate the instance of media exposure (e.g., an impression) to corresponding demographic information of the audience member. The database proprietor can then send logged demographic impression data to the AME for use by the AME in generating, for example, media ratings and/or other audience measures.

In some examples, the partner database proprietor does not provide individualized demographic information (e.g., user-level demographics) in association with logged impressions. Instead, in some examples, the partnered database proprietor provides aggregate demographic impression data (sometimes referred to herein as "aggregate census data"). For example, the aggregate demographic impression data provided by the partner database proprietor may show that a hundred thousand females age 17-45 watched the episode of "Modern Family" in the last seven days via computing devices (e.g., desktop computers, tables, smart phones, laptops, etc.). However, the aggregate demographic information from the partner database proprietor does not identify individual persons (e.g., is not user-level data) associated with individual impressions. In this manner, the database proprietor protects the privacies of its subscribers/users by not revealing their identities and, thus, user-level media access activities, to the AME.

The AME uses this aggregate demographic information to calculate ratings and/or other audience measures for corresponding media. However, during the process of registering with the database proprietor, a subscriber may lie or may otherwise provide inaccurate demographic information. For example, during registration, the subscriber may provide an inaccurate age or location. These inaccuracies cause errors in the aggregate demographic information from the partner database proprietor, and can lead to errors in audience measurement. To combat these errors, the AME recruits panelist households that consent to monitoring of their exposure to media. During the recruitment process, the AME obtains detailed demographic information from the members of the panelist household. The AME compares the detailed demographics to the demographic information the members of the panelist household supplied to the database proprietor(s) to predict how demographic information is inaccurate (e.g., misattributed) within the aggregate demographic information provided by the database proprietors. The example AME generates misattribution correction factors to be applied to the aggregate demographic information provided by the database proprietors to correct for the inaccuracies.

In examples disclosed herein, to retrieve the demographic information from the database proprietors, the AME obtains panelist database proprietor identifiers (DPIDs) for members the panelist household. As used herein, the DPID is an alphanumeric value assigned to the database proprietor subscriber when subscriber registers with the database proprietor. The DPID is used internally by the database proprietor to uniquely identify the subscriber. In some examples, the DPID is different than a subscriber chosen identifier (e.g., a username, an authentic name, etc.). For example, a first database proprietor subscriber named "Adam Smith" may have an assigned DPID of "44698599407828," and a second database proprietor subscriber named. "Adam Smith" may have an assigned DPID of "11790906116306." In some examples, the AME may, as part of the recruitment process, ask the members of the panelist household to provide their DPIDs. Alternatively or additionally, the AME may retrieve the panelist DPIDs from the computing devices of the panelist household. For example, the AME may extract the panelist DPIDs from "cookies" deposited on the computing device when a member of the panelist household visits the website of the database proprietor.

In some examples, the AME obtains a list of subscribers to a particular database proprietor and uses the panelist DPIDs to harvest the demographic information from the list. Alternately or additionally, the AME may use the panelist DPIDs to retrieve the demographic information of the members of the panelist household via an application programming interface (API) provided by the database proprietor. That is, the AME may use the API to retrieve the demographic information corresponding to panelists from a subscriber database of the database proprietor. However, using the API, the database proprietor may identify the members of the panelist households. For example, the data base proprietor may assume all queries coming from Internet Protocol (IP) addresses associated with the AME are queries for members of the panelist households.

In examples disclosed herein, to protect the privacy of panelist households from the database proprietor, the AME generates decoy DPIDs to mix with the panelist DPIDs. When the AME uses the API to retrieve the demographic information from the database proprietor, the AME creates a batch query that includes panelist DPIDs distributed (e.g., randomly distributed, pseudo-randomly distributed, etc.) amongst the decoy DPIDs according to an obfuscation target (e.g. a ratio). The obfuscation target defines a minimum number of decoy DPIDs that are to be in the batch query based on the number of panelist DPIDs to be queried. After a batch query is processed, the AME stores the demographic information associated with the panelist DPIDs and discards demographic information associated with the decoy DPIDs.

In examples disclosed herein, to generate the decoy DPIDs, the ANTE creates a probability density function (PDF) for one or more of the digit positions in the DPID. For example, if a DPID is a fourteen-digit numeric value, the AME creates fourteen PDFs, each corresponding to a position of one of the fourteen digits of the DPID. The probability distributions are generated based on the panelist household DPIDs retrieved from panelist household computing devices. For example, the AME may determine that the probability that the first digit position in the DPID is zero is 5.2%. To generate the decoy DPIDs, the AME samples (e.g., via inverse transform sampling, etc.) the probability density functions to produce a value for the corresponding digit positions.

In examples disclosed herein, after retrieving the demographic information from the database provider and discarding the demographic information associated with the decoy DPIDs, the AME assigns the panelist DPID to a particular member of the panelist household from which the panelist DPID was obtained. The AME compares the demographic information from the database proprietor to the demographic information of the members of the panelist household that was collected by the AME during, for example, the panel registration process. In some examples, the AME compares the given names and/or variants of the given names of the members of the panelist household to the names and/or past names included with the demographic information from the database proprietor. For example, if the given name of a member of a panelist household is "James," the AME also uses one or more of "James," "Jaime," "Jamie," "Jamey," "Jim," "Jimmy," "Jimi," "Jimmie," "Jay," etc. when comparing the given name of the member of the panelist household to the names and/or the past names included with the demographic information. In some examples, if the given name or any of the name variants of the member of the panelist household does not equal any of the names or the past names included with the demographic information, the AME compares the date of birth in the demographic information from the database proprietor to the birth dates of members of the panelist household. In some examples, the AME determines that the DPID is not associated with a member of the panelist household. For example, a friend may have logged into the database proprietor from a computing device in the panelist household. As such, although the friend has a DPID at the database proprietor, the friend's demographics stored with the DPID with the database proprietor will not match panelist demographics stored at the AME for the panelist household.

FIG. 1 illustrates an example system 100 to assign demographic information to panelists. In the illustrated example, an AME 102 provides a collector 103, a DPID extractor 104, and an AME identifier (AME ID) 106 to a computing device 108 (e.g., a desktop, a laptop, a tablet, a smartphone, etc.) associated with a panelist household. For example, the AME 102 may provide the collector 103, the DPID extractor 104, and the AME ID 106 via a registration website. In some examples, the collector 103, the DPID extractor 104 are performed by instructions (e.g., Java, java script, or any other computer language or script) embedded in the registration website, or any other suitable website. In some examples, the AME ID 106 is a cookie or is encapsulated in a cookie set in the computing device 108 by the AME 102. Alternatively, the AME ID 106 could be any other user and/or device identifier. In any case, the example AME ID 106 is an alphanumeric value that the AME 102 uses to identify the panelist household.

In the illustrated example, when a member of the panelist household uses the computing device 108 to visit a website and/or use an app associated with a database proprietor 110, the database proprietor 110 sets or otherwise provides, on the computing device 108, the panelist DPID 112 associated with subscriber credentials (e.g., user name and password, etc.) used to access the website and/or the app. In some examples, the panelist DPID 112 is a cookie or is encapsulated in a cookie. Alternatively, the panelist DPID 112 could be any other user and/or device identifier. The example DPID extractor 104 extracts the DPID 112 (e.g., from a cookie, etc.). The example collector 103 collects the panelist DPIDs 112 on the computing device 108 and sends an example ID message 114 to the example AME 102. In the illustrated example, the ID message 114 includes the extracted panelist DPID 112 and the AME ID 106 corresponding to the panelist household. In some examples, the DPID extractor 104 remembers the DPIDs 112 that have been extracted and sends the ID message package 114 when a new panelist DPID 112 has been extracted.

In the illustrated example of FIG. 1, the AMR 102 stores the extraction package 114 in a DPID database 116. The example extraction packages 114 in the DPID database 116 are from multiple panelist households (e.g., received from computing devices 108 associated with different panelist households, etc.). In the illustrated example, the AME 102 includes a demographic retriever 118 structured to retrieve database proprietor demographic information 120a from the database proprietor 110 for the panelist DPID(s) 112 associated with panelist households. The example demographic retriever 118 retrieves the panelist DPIDs 112 from the example DPID database 116. The example demographic retriever 118 generates decoy DPIDs 122a, 122b used to obscure the DPIDs 112 associated with panelist households. The number of decoy DPIDs 122a, 122b generated by the example demographic retriever 118 is based on the number of the panelist DPIDs 112 associated with panelist households being queried and the accuracy of the decoy DPIDs 122a, 122b generation process.

The example demographic retriever 118 randomly or pseudo-randomly mixes the panelist DPIDs 112 and the decoy DPIDs 122a, 122b to form a batch query 123. In the illustrated example, the database proprietor 110 provides an application program interface (API) that provides access to the database proprietor demographic information 120a, 120b based on DPIDs (e.g., the panelist DPIDs 112, the decoy DPIDs 122a, 122b, etc.). To retrieve the database proprietor demographic information 120a associated with the panelist DPIDs 112, the example demographic retriever 118 sends the batch query 123 to the example database proprietor 110. In response to the batch query 123, the database proprietor 110 returns a query response 125. For a particular panelist DPID 112, the query response 124 includes the database proprietor demographic information 120a associated with the particular panelist DPID 112. For the decoy DPIDs 122a, 122b, the query response 124 includes either (i) the database proprietor demographic information 120b associated with the decoy DPID 122a (e.g., by happenstance the decoy DPID 122a corresponds to a real subscriber), or (ii) an error 125 (e.g., the decoy DPID 122b does not correspond to a real subscriber). When the query response 124 includes the database proprietor demographic information 120b associated with the decoy DPID 122a, the example demographic retriever 118 discards database proprietor demographic information 120b associated with the decoy DPID 122a (e.g., releases a portion of memory that is storing the database proprietor demographic information 120b associated with the decoy DPID 122a allowing that portion of the memory to be overwritten).

The example AME 102 includes an example panelist comparator 126 to associate the panelist DPIDs 112 retrieved from the computing devices 108 of panelist households to members of the panelist households. For example, a panelist household may have four members (e.g., a father, a father, a son, a daughter, etc.) that are separate subscribers to the database proprietor 110. In such an example, the DPID extractor 104 may, over time, send multiple extraction packages 114 with each one of the extraction packages 114 associated with the panelist DPID 112 of one of the four members of the panelist household. The example panelist comparator 126 compares the database proprietor demographic information 120a associated with the panelist DPID 112 with the demographic information of the members of the panelist household associated with the AME ID 106 (e.g., from the corresponding extraction package 114). In the illustrated example, demographic information of the members of the panelist households is stored in an example panelist database 128.

The example panelist comparator 126 compares the example database proprietor demographic information 120a associated with the panelist DPID 112 to the demographic information of the members of the panelist household associated with the AME ID 106 to determine whether the panelist DPID 112 and the database proprietor demographic information 120a corresponds to a member of the panelist household. If the database proprietor demographic information 120a corresponds to the demographic information of one of the members of the panelist household, the database proprietor demographic information 120a and the panelist DPID 112 are stored in the example panelist database 128 in association with the AME ID 106 of the member of the panelist household and/or an identifier of the member of the panelist household (e.g. a panelist ID).

In the illustrated example, the AME 102 includes a misattribution calculator 130 to estimate errors (e.g., presence of errors and/or amounts of errors) in the database proprietor demographic information 120a based on the differences between the database proprietor demographic information 120a and the corresponding demographic information of the members of the panelist households. In the illustrated example, the demographic information in the panelist database 128 is considered to be highly accurate because the AME 102 collects highly accurate demographic information from the panelist households when the members of the panelist households consent to detailed monitoring of their access to media on computing devices (e.g., the computing device 108). As such, the misattribution calculator 130 considers differences between the database proprietor demographic information 120a and the corresponding demographic information in the panelist database 128 to be errors in the database proprietor demographic information 120a. For example, the database proprietor demographic information 120a for a member of the panelist household may indicate that the member is thirteen when the corresponding demographic information in the panelist database 128 indicates that the member is ten. In the illustrated example, the misattribution calculator 130 analyzes the database proprietor demographic information 120a relative to the demographic information in the panelist database 128 in the aggregate. For example, misattribution calculator 130 may detect that 1.2% of the ages of males with reported ages (e.g., ages reported to the database proprietor 110) of 13-16 are inaccurate by one year, 0.7% of the ages of males with reported ages of 13-16 are inaccurate by two years, etc.

The example misattribution calculator 130 generates misattribution correction factors used to correct the aggregate exposure data provided by the database proprietor 110. Examples disclosed herein may be used in connection with techniques for generating misattribution correction factors are disclosed in U.S. patent application Ser. No. 14/560,947, filed Dec. 4, 2014, entitled "Methods and Apparatus to Compensate Impression Data for Misattribution and/or Non-Coverage by a Database Proprietor," U.S. patent application Ser. No. 14/569,474, filed Dec. 12, 2014, entitled "Method and Apparatus to Generate Electronic Mobile Measurement Census Data," and U.S. patent application Ser. No. 14/604,394, filed Jan. 23, 2015, entitled "Methods and Apparatus to Correct Age Misattribution in Media impressions," which are incorporated by reference in their entirety herein.

Figure 2:
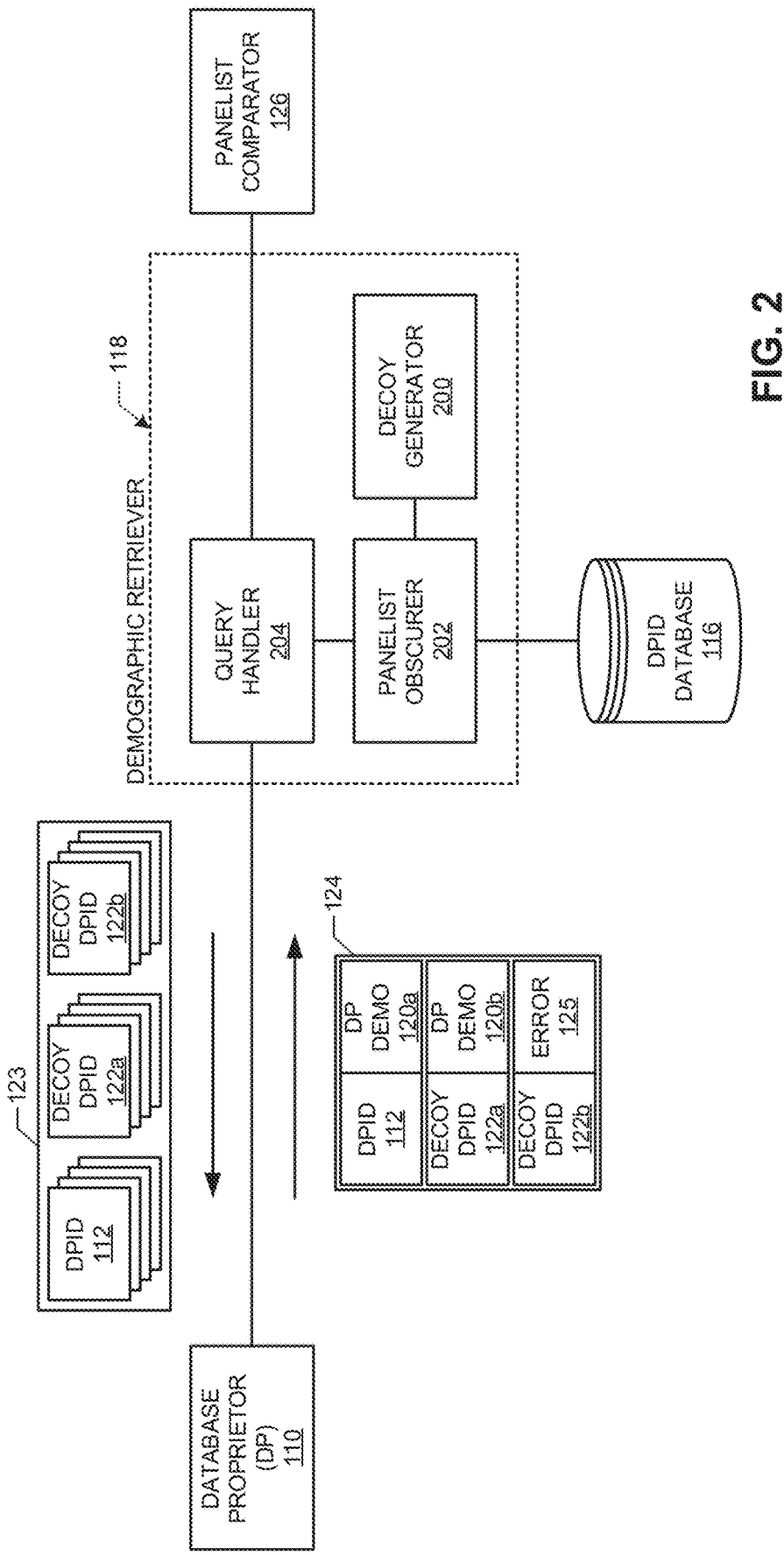
FIG. 2 illustrates the example demographic retriever of FIG. 1 to retrieve panelist demographic information from the example database proprietor of FIG. 1.

FIG. 2 illustrates the example demographic retriever 118 of FIG. 1 to retrieve example database proprietor demographic information 120a, 120b from the example database proprietor 110 of FIG. 1. The example demographic retriever 118 is structured to retrieve the database proprietor demographic information 120a while obscuring the identities of the members of the panelist households. In the illustrated example, the demographic retriever 118 includes an example decoy generator 200, an example panelist obscurer 202, and an example query handler 204.

The example decoy generator 200 generates decoy DPIDs 122a, 122b used to reduce the likelihood that the database proprietor 110 is able to identify the panelist DPIDs 112 associated with the members of the panelist households. The example decoy generator 200 creates PDFs to increase the likelihood that a decoy DPID 122a, 122b will correspond to a real subscriber to the database proprietor 110 to better obscure the identities of members of the panelist households. For example, if the database proprietor 110 is trying to identify the members of the panelist households, the database proprietor 110 would likely discard any queries associated with decoy DPIDs 122b that do not correspond to real subscribers. The example panelist DPIDs 112 have N digit positions. The example decoy generator 200 creates PDFs that characterize the probability that a current digit position ($N_j$) has a particular value. The number of digit positions (N) and a range of possible values (e.g., a value between 0 and 9 (decimal), a value between 0 and F (hexadecimal), a value between 0 and Z (alphanumeric), etc.) may be different for different database proprietors 110. For example, a database proprietor 110 may have fourteen digit positions ($N_0$-$N_{13}$) with possible decimal values e.g., between 0 and 9). In such an example, a database proprietor 110 with 1.44 billion active subscribers has 100 trillion possible panelist DPIDs 112 that are potentially not assigned sequentially.

To generate the PDF for the corresponding digit positions (N), the decoy generator 200, from time to time (e.g., periodically, aperiodically, etc.), statistically analyzes the panelist DPIDs 112 in the DPID database 116. In some examples, the decoy generator 200 also includes previously generated decoy DPIDs 122a that result in receiving database proprietor demographic information 120b from the database proprietor 110 because those ones of the decoy DPIDs 122a actually corresponded to real subscribers. In the illustrated example, to generate a PDF ($PDF_j$) for a digit position ($N_j$), the decoy generator 200 calculates independent probabilities ($P_{ij}$) for the possible values in that digit position ($N_j$). For example, the decoy generator 200 may determine that the independent probability that the second digit position is "7" is 14% ($P_{i2}(7)=14\%$)

In some examples, the decoy generator 200 calculates conditional probabilities ($P_{cj}$) for the possible values in that digit position ($N_j$) based on the value selected for a previous digit position (N−1) and/or a next previous digit position (N−2). For example, the decoy generator 200 may determine that the condition probability that the second digit position is "7," given that the value of the first digit position is "2," is 36% ($P_{c2}(7|N_1=2)=36\%$). In some examples, the decoy generator 200 calculates divergence between the independent probability ($P_{ij}$) and the conditional probability ($P_{cj}$). The divergence determines how dependent (e.g., conditional) the value of the current digit position (N) on the value of a previous digit position (e.g., N−1, N−2, etc.). In some such examples, the divergence is calculated using the Jensen-Shannon divergence (JSD) using Equation 1, Equation 2, and Equation 3 shown below.

$$JSD(P_{cj}\|P_{ij}) = \frac{1}{2}D(P_{cj}\|M) + \frac{1}{2}D(P_{ij}\|M) \qquad \text{Equation 1}$$

$$D(P\|Q) = \sum_i P(i) * \log_2\left(\frac{P(i)}{Q(i)}\right) \qquad \text{Equation 2}$$

$$M = \frac{1}{2}(P_{cj} + P_{ij}) \qquad \text{Equation 3}$$

In Equation 1, Equation 2, and Equation 3 above, JSD calculates the extent that the value of the current digit position (N) is conditional on the value of the previous digit position (N−1). In the illustrated example, the decoy generator 200 compares the calculated JSD to a divergence threshold. If the JSD satisfies (e.g., is greater than) the divergence threshold, the decoy generator 200 uses the conditional probability ($P_{cj}$) based on the previous digit position (N−1) when generating the corresponding PDF ($PDF_j$).

In some examples, if the JSD is not satisfied (e.g., is less than) the divergence threshold, the decoy generator 200 recalculates the Jensen-Shannon divergence (JSD) using the conditional probability ($P_{cj}$) based on the other previous digit position (e.g., N−2, N−3, etc.) until either (i) the divergence threshold is satisfied, or (ii) the previous digit positions have been tried. If a conditional probability ($P_{cj}$) based on one of the previous digit position satisfies the divergence threshold, the particular conditional probability ($P_{cj}$) is used to generate the corresponding PDF ($PDF_j$). If the previous digit positions have been tried and the divergence threshold has not been satisfied, the example decoy generator 200 uses the independent probability ($P_d$) to generate the corresponding PDF ($PDF_j$).

The example decoy generator 200 generates decoy DPIDs 122a, 122b by sampling the PDFs for the digit positions ($N_0$-$N_j$). In some examples, the decoy generator 200 uses inverse sampling to generate the decoy DPIDs 122a, 122b. For example, for a fourteen-digit DPID, the decoy generator 200 samples the fourteen PDFs corresponding to the fourteen digit positions. The example decoy generator 200 assigns a confidence value to the decoy DPIDs 122a, 122b based on the probability that a generated decoy DPID 122a, 122b will correspond to a real subscriber to the database proprietor 110. For example, if the decoy generator 200 randomly generates the decoy DPID 122a, 122b, the decoy generator 200 may assign the decoy DPID 122a, 122b a confidence level of 0.000014 (e.g., one out of every 70000 generated decoy DPIDs 122a, 122b is expected to correspond to a real subscriber registered with the database proprietor 110). As another example, if the decoy generator 200 generates the decoy DPID 122a, 122b with PDFs based on independent probabilities ($P_{I,j}$), the decoy generator 200 may assign the decoy DPID 122a, 122b a confidence level of 0.1 (e.g., one out of every ten generated decoy DPIDs 122a, 122b is expected to correspond to a real subscriber registered with the database proprietor 110).

In the illustrated example of FIG. 2, the panelist obscurer 202 receives or otherwise retrieves the decoy DPIDs 122a, 122b generated by the decoy generator 200. The example panelist obscurer 202 randomly or pseudo-randomly distributes the panelist DPIDs 112 from the example DPID database 116 amongst the decoy DPIDs 122a, 122b to create the example batch query 123. FIG. 3 illustrated an example batch query 123 with panelist DPIDs (e.g., the PDPIDs 112a-112d) randomly or pseudo-randomly distributed amongst the decoy DPIDs (e.g., the DDPIDs 122a-122h). In the illustrated example of FIG. 2, the AME 108 sets an obscuration target ($O_T$) that is the target ratio of decoy DPIDs 122a corresponding to real subscribers and the panelist DPIDs 112. A higher obscuration target ($O_T$) makes it less likely that a database proprietor 110 would be able to discern which of the queried DPIDs 112, 122a, 122b belong to members of panelist households. For example, the obscuration target ($O_T$) may be 66%. In such an example, the obscuration target ($O_T$) of 66% means that for queries that return database proprietor demographic information 120a, 120b, 34% will correspond to the panelist DPIDs 112 and 66% will correspond to decoy DPIDs 122a. A minimum number of the decoy DPIDs 122a, 122b used by the panelist obscurer 202 to achieve the obscuration target ($O_T$) is calculated using Equation 4 below.

$$\text{Min(Decoy } DPID\text{)} = \frac{\left(\frac{\text{Num(Panelist } DPID\text{)}}{(1-O_T)} - \text{Num(Panelist } DPID\text{)}\right)}{\text{Confidence Level}} \quad \text{Equation 4}$$

In Equation 4 above, Min(decoy DPID) is the minimum number of the decoy DPIDs 122a, 122b to be used, Num (Panelist DPID) is the number of panelist DPIDs 112 to be obscured, and confidence level is the confidence level assigned to the decoy DPIDs 122a, 122b by the decoy generator 200. For example, if the panelist obscurer 202 is to obscure 100 panelist DPIDs 112 with an obscuration target ($O_T$) of 66%, and the decoy generator 200 assigns the decoy DPIDs 122a, 122b a confidence level of 0.1, the panelist obscurer 202 would use 1941 decoy DPIDs 122a, 122b (4100/(1−0.66))−100)/0.1). In such an example, the panelist obscurer 204 would randomly mix the 100 panelist DPIDs 112 into the 1941 decoy DPIDs 122a, 122b to create the batch query 123.

In the illustrated example of FIG. 2, the query handler 204 receives or otherwise retrieves the batch query 123 from the example panelist obscurer 202. The example query handler 204 queries the database proprietor 110 with the randomly mixed panelist DPIDS 112 and decoy DPIDs 122a, 122b in the example query batch query 123 in the order presented in the batch query 123. In the illustrated example, the query handler 204 uses an API provided by the database proprietor 110 to query the database proprietor 110 for demographic information corresponding to the panelist DPIDs 112 and decoy DPIDs 122a, 122b. For the randomly mixed panelist DPIDs 112 and decoy DPIDs 122a, 122b, the example query handler 204 may receive numerous types of responses from the database proprietor 110, including (i) database proprietor demographic information 120a corresponding to the panelist PDIDs 112, (ii) database proprietor demographic information 120b corresponding to the decoy DPIDs 122a, and (iii) an error 125 corresponding to particular decoy DPIDs 122b that are not associated with database proprietor demographic information 120.

For panelist DPIDs 112 that correspond to database proprietor demographic information 120a, the example query handler 204 forwards to the example panelist comparator 126 the panelist DPIDs 112 that are associated with database proprietor demographic information 120a along with the corresponding AME Ms 106 (e.g., the AME IDs 106 stored in association the panelist DPIDs 112 in the DPID database 116). The example query handler 204 discards the decoy DPIDs 122h that return with an error 125. In some examples, the query handler 204 discards the decoy DPIDs 122a that are associated with database proprietor demographic information 120b. Alternatively, in some examples, the query handler 204 saves the decoy DPIDs 122a that are associated with database proprietor demographic information 120b to be used by the decoy generator 200 to, for example, update the PDFs used to generate the decoy DPIDs 122a, 122b. In this manner, the example decoy generator can improve the PDFs by increasing the sample size of DPIDs 112, 122a used to generate the PDFs. In such examples, the query handler 204 discards the database proprietor demographic information 120b corresponding to the decoy DPIDs 122a. In some examples, the decoy generator 200 uses the decoy DPIDs 122a that return the database proprietor demographic information 120b and the decoy DPIDs 122b that return the error 125 to adjust the confidence level used to calculate the minimum number of decoy DPIDs 122a, 122b. In this manner, the example panelist obscurer 202 can improve (e.g. decrease) the number of decoy DPIDs 122a, 122b used to generate a batch query 123. For example, the decoy DPIDs 122a that return the database proprietor demographic information 120b may indicate that the confidence level is too low (e.g., one out of every fifteen decoy DPIDs 122a correspond to an actual subscriber to the database proprietor 110 instead of one out of every ten DPIDs 122a, 122b, etc.).

While an example manner of implementing the example demographic retriever 118 of FIG. 1 is illustrated in FIG. 2, one or more of the elements, processes and/or devices illustrated in FIG. 2 may be combined, divided, re-arranged, omitted, eliminated and/or implemented in any other way.

Further, the example decoy generator 200, the example panelist obscurer 202, the example query handler 204, and/or, more generally, the example demographic retriever 118 of FIG. 1 may be implemented by hardware, software, firmware and/or any combination of hardware, software and/or firmware. Thus, for example, any of the example decoy generator 200, the example panelist obscurer 202, the example query handler 204, and/or, more generally, the example demographic retriever 118 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example decoy generator 200, the example panelist obscurer 202, and/or the example query handler 204 is/are hereby expressly defined to include a tangible computer readable storage device or storage disk such as a memory, a digital versatile disk (DVD), a compact disk (CD), a Blu-ray disk, etc. storing the software and/or firmware. Further still, the example the example demographic retriever 118 of FIG. 1 may include one or more elements, processes and/or devices in addition to, or instead of, those illustrated in FIG. 2, and/or may include more than one of any or all of the illustrated elements, processes and devices.

Figure 4:
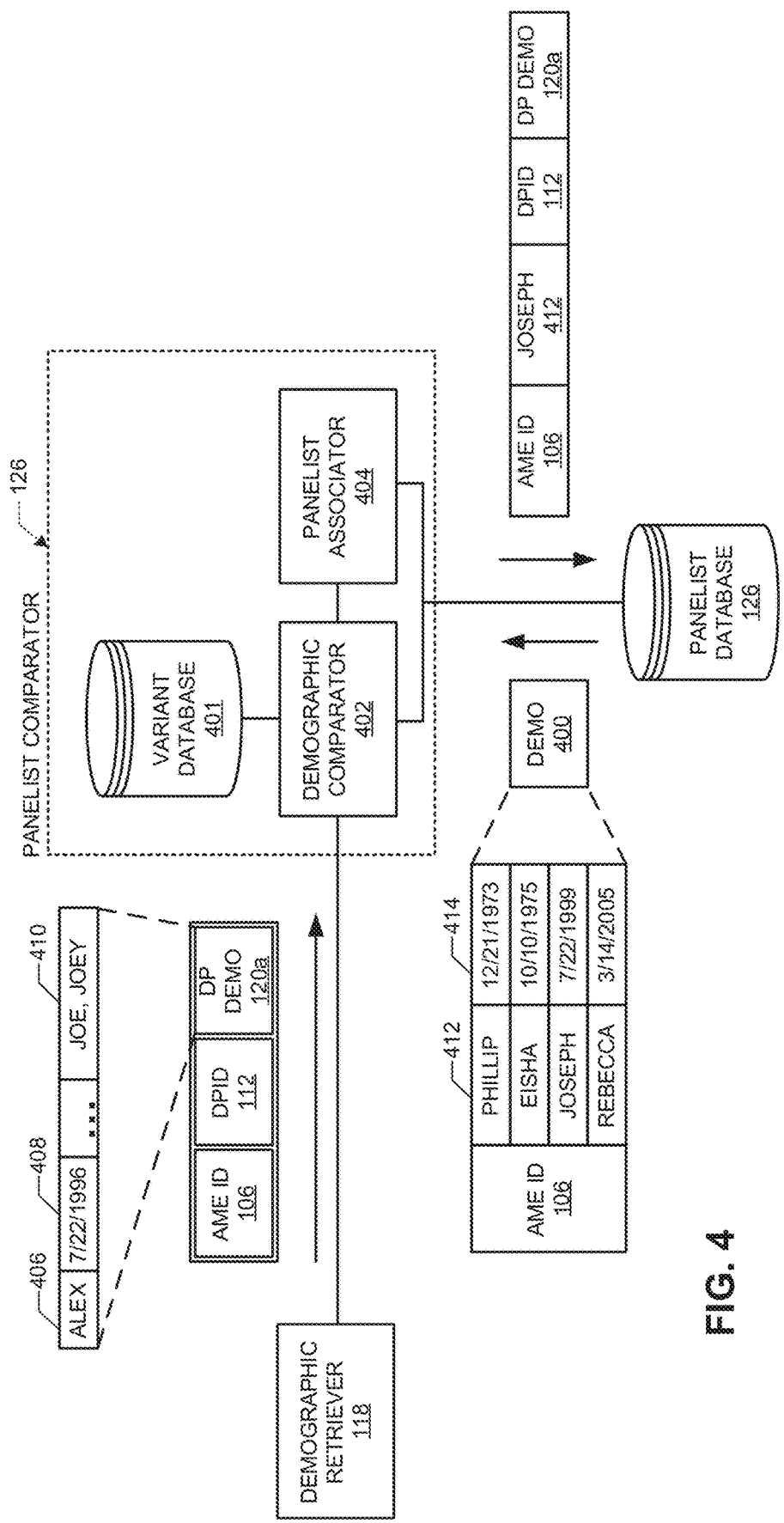
FIG. 4 illustrates the example panelist comparator of FIG. 1 to assign a database proprietor identifier to a member of a panelist household.

FIG. 4 illustrates the example panelist comparator 126 of FIG. 1. The example panelist comparator 126 is structured to assign a panelist DPID 112 to a member of a panelist household. In the illustrated example, to make the assignment, the example panelist comparator 126 uses the database proprietor demographic information 120a received from the demographic retriever 118 and panelist demographic information 400 stored the panelist database 126. In the illustrated example, the panelist comparator 126 includes an example variant database 401, an example demographic comparator 402, and an example panelist associator 404. The example variant database 401 includes variants of given names (e.g. nicknames, pet names, diminutive forms, etc.). For example, for the given name "Margaret," the variant database may include "Greta," "Maggie," Marge," "Margo," "Meagan," "Peg," "Peggy," and/or "Molly," etc.

The example demographic comparator 402 compares database proprietor demographic information 120a with panelist demographic information 400 in the panelist database 126. In the illustrated example, the demographic comparator 402 receives the example AME ID 106, the example panelist DPID 112, and the example database proprietor demographic information 120a from the demographic retriever 118. In the illustrated example, the database proprietor demographic information 120a includes a subscriber given name 406, a subscriber date of birth (DOB) 408 and subscriber past name(s) 410. The example subscriber past name(s) 410 refer to names that have been used in connection with the panelist DPID 112 in the past according to the database proprietor demographic information 120a (e.g., the database proprietor 110 of FIG. 1 stores past names when a subscriber changes the name used in connection with the database proprietor 110). In some examples, the database proprietor demographic information 120a also includes other demographic information (e.g., geographic location, race, income level, education level, religion, etc.) that may be used by the misattribution calculator 130 (FIG. 1) to calculate misattribution correction factors.

The example demographic comparator 402 retrieves the demographic information 400 of the members of the panelist household identified by the AME ID 106. In the illustrated example, the demographic information 400 includes example panelist given names 412 and example panelist DOBs 414. The example demographic comparator 402 standardizes the subscriber given name 406, the subscriber past name(s) 410 and the panelist given name(s) 412 by converting them to upper case characters and removing diacritics (e.g. changing "à" to "a", changing "ü" to "u", changing "ñ" to "n", etc.).

The example demographic comparator 402 compares the subscriber given name 406 to the panelist given name(s) 412 and/or or variants of the panelist given name(s) 412 stored in the variant database 400. In some examples, if the subscriber given name 406 is not a match for the panelist given name(s) 412 and/or variants of the panelist given name(s) 412, the example demographic comparator 402 compares the past name(s) 410 to the panelist given name(s) 412 and/or or variants of the panelist given name(s) 412. In some examples, if neither the subscriber given name 406 nor the subscriber past name(s) 410 are a match for one of the panelist given names 412, the example demographic comparator 402 compares the subscriber DOB 408 with the panelist DOB 414. In some examples, if none of the subscriber given name 406, the subscriber past name(s) 410, or the subscriber DOB 408 are a match, the example demographic comparator 402 determines that the panelist DPID 112 is not to be associated with the members of the panelist household (e.g., the panelist DPID 112 may be associated with a friend of a member of the panelist household, etc.). For example, if the subscriber given name 406 is "Alex" and the subscriber past names 410 are "Joe" and "Joey," the demographic comparator 402 indicates that the member of the panelist household with the panelist given name 412 "Joseph" is a match. In that example, the demographic comparator 402 indicates a match because variants (e.g., in the variant database 401) of the panelist given name 412 "Joseph" include "Joe" and "Joey," and "Joe" and "Joey" are the subscriber past names 410 associated with the database proprietor demographic information 120a.

In the illustrated example of FIG. 4, the panelist associator 404 stores the panelist DPID 112 in the panelist database 126 in association with the AME ID 106 of the member of the panelist household that the example demographic comparator 402 indicated as a match for the panelist DPID 112. Additionally, the example panelist associator 404 stores the database proprietor demographic information 120a in association with the panelist DPID 112 in the panelist database 126.

While an example manner of implementing the example panelist comparator 126 of FIG. 1 is illustrated in FIG. 4, one or more of the elements, processes and/or devices illustrated in FIG. 4 may be combined, divided, re-arranged, omitted, eliminated and/or implemented in any other way. Further, the example demographic comparator 402, the example panelist associator 404, and/or, more generally, the example panelist comparator 126 of FIG. 1 may be implemented by hardware, software, firmware and/or any combination of hardware, software and/or firmware. Thus, for example, any of the example demographic comparator 402, the example panelist associator 404, and/or, more generally, the example panelist comparator 126 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example demographic comparator 402, and/or the example panelist associator 404 is/are hereby expressly defined to include a tangible computer readable storage device or storage disk such as a memory, a digital versatile disk (DVD), a compact disk (CD), a Blu-ray disk, etc. storing the software and/or firmware. Further still, the example the example panelist comparator 126 of FIG. 1 may include one or more elements, processes and/or devices in addition to, or instead of, those illustrated in FIG. 2, and/or may include more than one of any or all of the illustrated elements, processes and devices.

Figure 5:
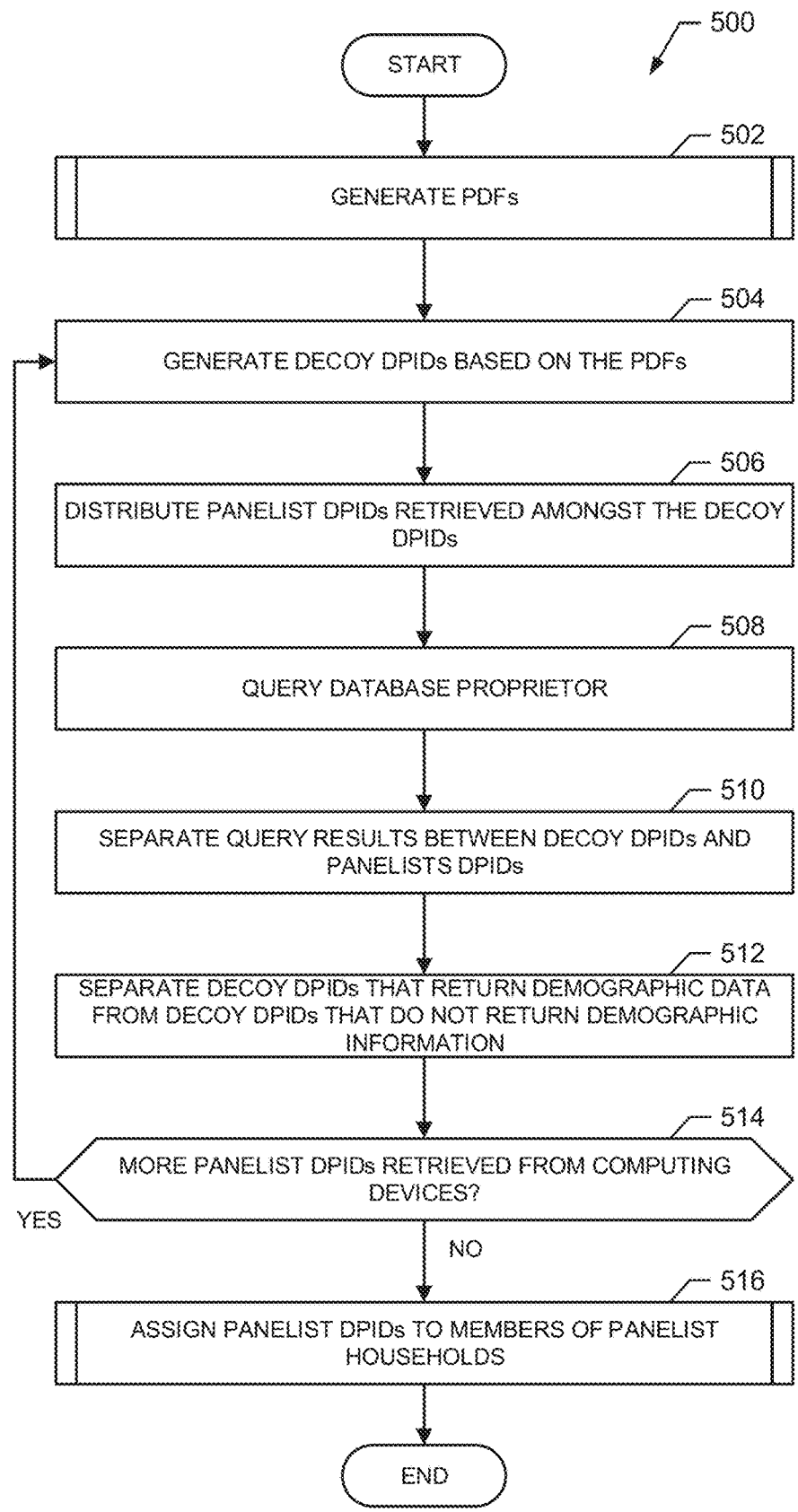
FIG. 5 is a flow diagram representative of example machine readable instructions that may be executed to implement the example demographic retriever of FIGS. 1 and 2 and/or the example panelist comparator of FIGS. 1 and 4 to assign demographic information to panelists.
Figure 6:
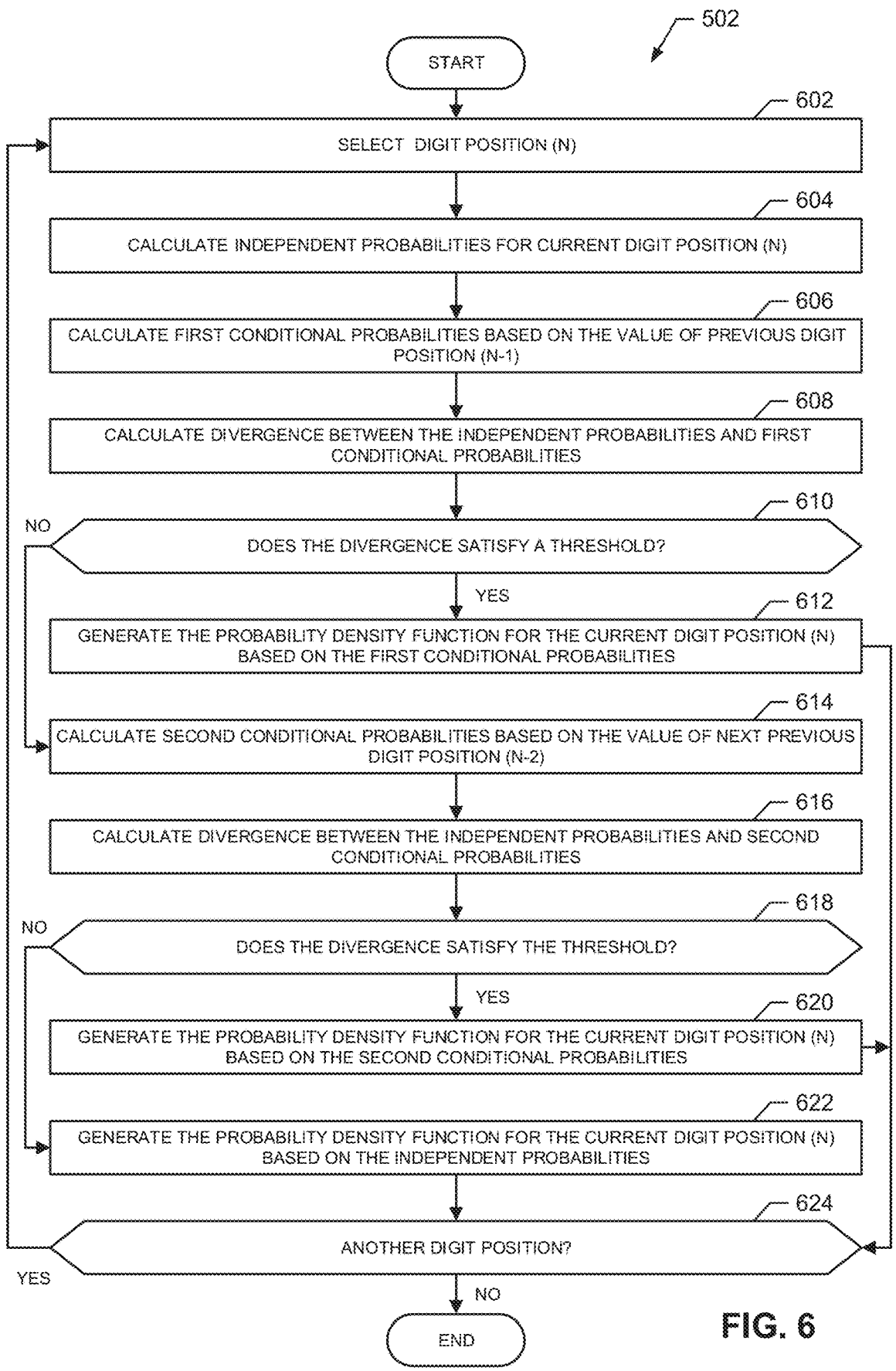
FIG. 6 is a flow diagram representative of example machine readable instructions that may be executed to implement the example decoy generator of FIG. 2 to generate probability density functions (PDFs) used to generate decoy database proprietor identifiers.
Figure 7:
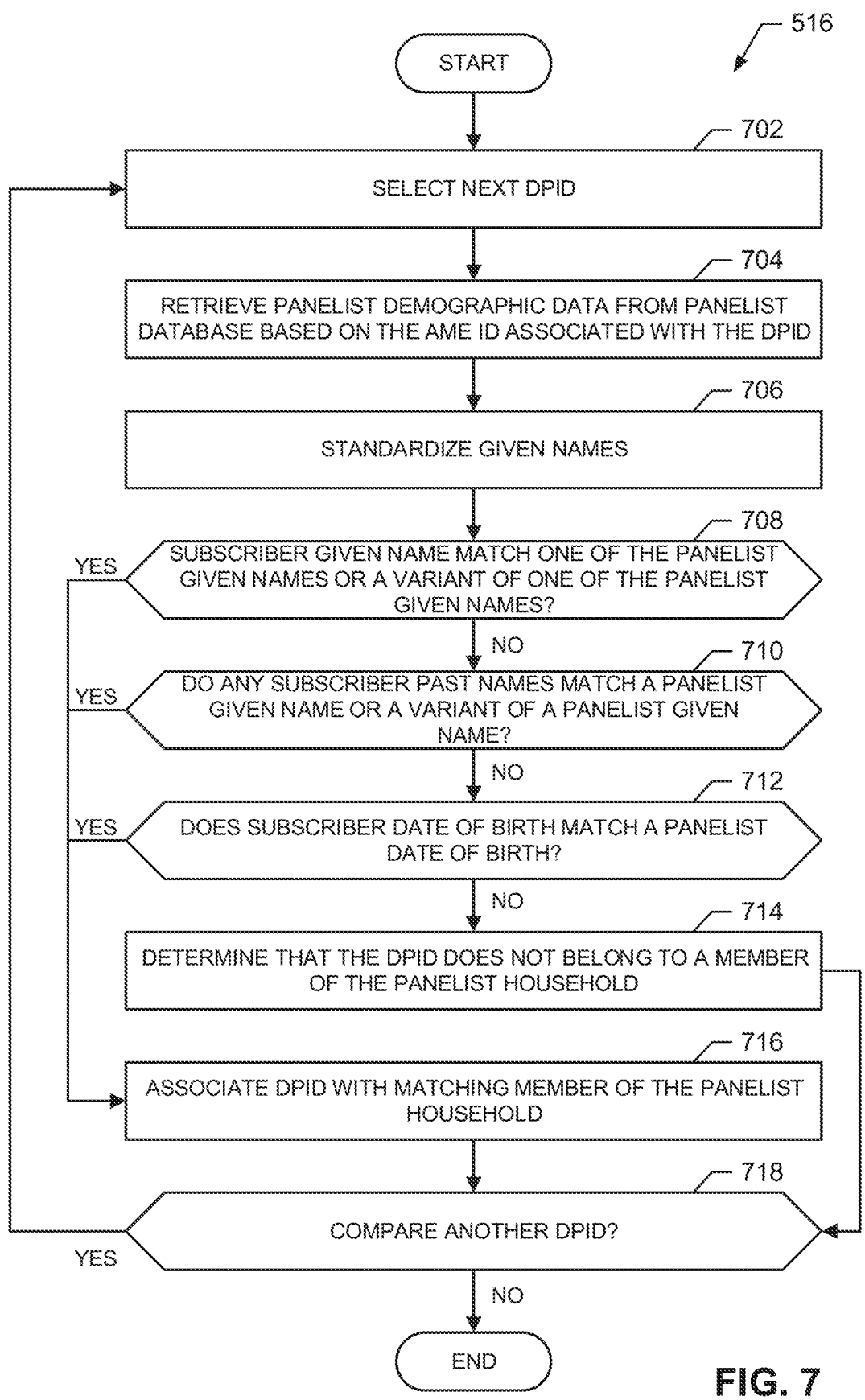
FIG. 7 is a flow diagram representative of example machine readable instructions that may be executed to implement the example panelist comparator of FIGS. 1 and 4 to assign a database proprietor identifier to a member of a panelist household.

A flowchart representative of example machine readable instructions for implementing the example demographic retriever 118 of FIGS. 1 and 2 is shown in FIG. 5. A flowchart representative of example machine readable instructions for implementing the example decoy generator 118 of FIG. 2 is shown in FIG. 6. A flowchart representative of example machine readable instructions for implementing the example panelist comparator of FIGS. 1 and 4 is shown in FIG. 7. In these examples, the machine readable instructions comprise a program for execution by a processor such as the processor 812 shown in the example processor platform 800 discussed below in connection with FIG. 8. The program(s) may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIGS. 5, 6, and/or 7, many other methods of implementing the example demographic retriever 118, the example decoy generator 200, and/or the example panelist comparator 126 may alternatively be used. For example, the order of execution of the blocks may be changed, and/or some of the blocks described may be changed, eliminated, or combined.

As mentioned above, the example processes of FIGS. 5, 6, and/or 7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5, 6, and/or 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration, for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 5 is a flow diagram representative of example machine readable instructions 500 that may be executed to implement the example demographic retriever 118 of FIGS. 1 and 2 and/or the example panelist comparator 126 of FIGS. 1 and 4 to assign demographic information to panelists. Initially, at block 502, the example decoy generator 200 (FIG. 2) generates PDFs used to generate the decoy DPIDs 122a, 122b (FIGS. 1, 2, and 3). An example for generating the PDFs is disclosed in connection with FIG. 6 below. At block 504, the example decoy generator 200 generates the decoy DPIDs 122. The example decoy generator 200 generates an amount of the decoy DPIDs 122 as requested by the example panelist obscurer 202 (FIG. 2). In some examples, the amount of decoy DPIDs 122a, 122b the panelist obscurer 202 requests is calculated in accordance with Equation 4 above. At block 506, the example panelist obscurer 202 randomly or pseudo-randomly distributes the example panelist DPIDs 112 (FIGS. 1, 2, 3, and 4) retrieved from computing devices 108 (FIG. 1) associated with panelist households amongst the example decoy DPIDs 122a, 122b generated at block 504.

At block 508, the example query handler 204 (FIG. 2) queries the database proprietor 110 (FIGS. 1 and 2) using the example panelist DPIDs 112 randomly or pseudo-randomly distributed amongst the example decoy DPIDs 122a, 122b. At block 510, the example query handler 204 separates the results of the query between the example panelist DPIDs 112 and the example decoy DPIDs 122a, 122b. At block 512, the example query handler 204 separates the example decoy DPIDs 122a that correspond to returned database proprietor demographic information 120b (FIGS. 1, 2, and 4) from example decoy DPIDs 122b that correspond to the returned error 125 (FIGS. 1 and 2). In some examples, the example decoy DPIDs 122a that correspond to returned database proprietor demographic information 120b are saved for further analysis (e.g., to refine the PDFs generated by the decoy generator 200, etc.).

At block 514, the example panelist obscurer 202 determines whether there are more of the panelist DPIDs 112 retrieved from example computing devices 108 associated with the panelist households to be queried. If there are more of the panelist DPIDs 112, program control returns to block 504. Otherwise, if there are not more of the panelist DPIDs 112, program control advances to block 516. At block 516, the example panelist comparator 126 assigns the panelist DPIDs 112 to members of panelist households stored in the panelist database 128 (FIGS. 1 and 4). An example of assigning the panelist DPIDs 112 to members of panelist households is disclosed in connection with FIG. 7 below. The example program 500 then ends.

FIG. 6 is a flow diagram representative of example machine readable instructions 502 that may be executed to implement the example decoy generator 200 of FIG. 2 to generate PDFs used to generate decoy DPIDs 122a, 122b (FIGS. 1 and 2). Initially, at block 602, the example decoy generator 200 selects a digit position (N). For example, for a database proprietor (e.g., the database proprietor 110 of FIGS. 1 and 2) that has a ten digit DPID (e.g., digits $N_0$-$N_9$), the decoy generator 200 initially selects the digit position with the smallest place value (e.g., digit No) of a decoy DPID 122a, 122b to be generated. At block 604, the decoy generator 200 calculates independent probabilities (P(N))

for the possible values (e.g., 0-9, etc.) of the current digit position (N). For example, the decoy generator 200 may calculate a number of times a value appears in the current digit position (N) divided by a total number of DPIDs being analyzed. For example, the current digit (No) may have independent probabilities as illustrated in Table 1 below.

TABLE 1

EXAMPLE INDEPENDENT PROBABILITIES FOR THE CURRENT DIGIT POSITION $N_0$

| Value | 0 | 1 | 2 | 3 | 4 | 5 | 6 | 7 | 8 | 9 |
|---|---|---|---|---|---|---|---|---|---|---|
| $P(N_0)$ | 0.10 | 0.05 | 0.05 | 0.30 | 0.15 | 0.12 | 0.03 | 0.00 | 0.15 | 0.05 |

At block 606, the decoy generator 200 calculates first conditional probabilities (P(V|N−1)) of the current digit position (N) based on the value of the previous digit position (N−1). For example, the decoy generator 200 may calculate a number of times a value appears in the current digit position (N) when the previous digit position (N−1) has a particular value divided by the total number of DPIDs being analyzed. For example, the current digit ($N_1$) may have conditional probabilities based on the previous digit ($N_0$) as illustrated in Table 2 below.

TABLE 2

EXAMPLE CONDITIONAL PROBABILITIES FOR THE CURRENT DIGIT POSITION ($N_1$) BASED ON PREVIOUS DIGIT ($N_0$)

| Value (V) | 0 | 1 | 2 | 3 | 4 | 5 | 6 | 7 | 8 | 9 |
|---|---|---|---|---|---|---|---|---|---|---|
| $P(V\|N_0 = 0)$ | 0.10 | 0.05 | 0.05 | 0.30 | 0.15 | 0.12 | 0.03 | 0.00 | 0.15 | 0.05 |
| $P(V\|N_0 = 1)$ | 0.08 | 0.03 | 0.04 | 0.25 | 0.27 | 0.18 | 0.00 | 0.00 | 0.12 | 0.03 |
| ... | ... | ... | ... | ... | ... | ... | ... | ... | ... | ... |
| $P(V\|N_0 = 9)$ | 0.11 | 0.05 | 0.05 | 0.31 | 0.14 | 0.12 | 0.00 | 0.00 | 0.15 | 0.07 |

At block 608, the decoy generator 200 calculates the divergence between the independent probabilities generated at block 604 and the first conditional probabilities generated at block 606. The example decoy generator 200 calculates the Jensen Shannon divergence in accordance with Equation 1 Equation 2, and Equation 3 above. At block 610, the example decoy generator 200 determines if the divergence calculated at block 608 satisfies (e.g., is greater than) a divergence threshold. If the divergence satisfies the divergence threshold, program control advances to block 612. Otherwise, if the divergence does not satisfy the divergence threshold, program control advances to block 614. At block 612, the example decoy generator 200 generates the PDFs for the current digit position (N) based on the first conditional probabilities calculated at block 606. Program control then advances to block 624.

At block 614, the decoy generator 200 calculates second conditional probabilities (P(V|N−2)) of the current digit position (N) based on the value of the next previous digit position (N−2). For example, the decoy, generator 200 may calculate a number of times a value appears in the current digit position (N) when the next previous digit position (N−1) has a particular value divided by the total number of DPIDs being analyzed. At block 616, the decoy generator 200 calculates the divergence between the independent probabilities generated at block 604 and the second conditional probabilities generated at block 614. At block 618, the example decoy generator 200 determines it the divergence calculated at block 616 satisfies (e.g., is greater than) the divergence threshold. If the divergence satisfies the divergence threshold, program control advances to block 620. Otherwise, if the divergence does not satisfy the divergence threshold, program control advances to block 622. At block 620, the example decoy generator 200 generates the PDFs for the current digit position (N) based on the second conditional probabilities calculated at block 614. Program control then advances to block 624.

At block 622, the example decoy generator 200 generates the PDFs for the current digit position (N) based on the independent probabilities calculated at block 604. At block 624, the example decoy generator 200 determines whether there is another digit position (N+0.1) to analyze. If there is another digit position to analyze, program control returns to block 602 to select the next digit position of the decoy DPID being generated. Otherwise, if there is not another digit position to analyze, the example program 502 ends.

FIG. 7 is a flow diagram representative of example machine readable instructions 516 that may be executed to implement the example panelist comparator 126 of FIGS. 1 and 4 to assign panelist DPIDS 112 (FIGS. 1, 2, 3, and 4) to members of a panelist household. Initially, at block 702, the example demographic comparator 402 selects one of the panelist DPIDs 112 received or otherwise retrieved from the example demographic retriever 118. At block 704, the example demographic comparator 402 retrieves panelist demographic information 400 (FIG. 4) (e.g., the panelist given name(s) 412 (FIG. 4), the panelist DOB(s) 414 (FIG. 4), etc.) of member(s) of the panelist household identified by the AME ID 106 (FIGS. 1 and 4) associated with the selected panelist DPID 112 from the example panelist database 126 (FIGS. 1 and 4).

At block 706, the example demographic comparator 402 standardizes given names. For example, the demographic comparator 402 standardizes the example subscriber given names 406 (FIG. 4) and the example subscriber past names 410 (FIG. 4) included in example database proprietor demographic information 120a associated with the example panelist DPID 112 and the example panelist given name(s) 412 associated with the example AME ID 106. To standardize the example subscriber given names 406, the example subscriber past names 410 and the example panelist given name(s) 412, the example demographic comparator 402 capitalizes letters and removes the diacritics. For example, the subscriber given name 406 "József" would be standardized to "JOZSEF."

At block 708, the example demographic comparator 402 determines whether the subscriber given name 406 matches one of more of the panelist given names 412 and variants of the panelist given name 412 stored in the variant database 401. If the subscriber given name 406 matches one of the panelist given names 412 or one of the variants of the one of panelist given names 412, program control advances to block 716. Otherwise, if the subscriber given name 406 does not match the panelist given names 412 or the variants of the panelist given names 412, program control advances to block 710. At block 710, the example demographic comparator 402 compares the subscriber past name(s) 410 to the panelist given name(s) 412 and the variants of the panelist given names 412. If one of the subscriber past names 410 matches one of the panelist given names 412 or one of the variants of one of the panelist given names 412, program control advances to block 716. Otherwise, if the subscriber past names 410 do not match the panelist given names 412 or the variants of the panelist given names 412, program control advances to block 712. At block 712, the example demographic comparator 402 compares the subscriber DOB 408 with the panelist DOB(s) 414. If the subscriber DOB 408 matches one of the panelist DOBs 414, program control advances to block 716. If the subscriber DOB 408 does not match the panelist DOBs 414, program control advances to block 714. At block 714, the example panelist associator 404 determines that the panelist DPID 112 selected at block 702 does not belong to a member of the panelist household.

At block 716, the example panelist associator 404 associates the panelist DPID 112 with the matching member of the panelist household determined at block 708, block 710, or block 712. The example panelist associator 404 also associates the database proprietor demographic information 120a with the matching member of the panelist household. Additionally, the example panelist associator 404 stores the panelist DPID 112 and the database proprietor demographic information 120a in the panelist database 128 in association with the AME ID 106. At block 718, the example demographic comparator 402 determines whether another panelist DPID 112 is to be compared to the members of the panelist households in the panelist database 128. If another panelist DPID 112 is to be compared, program control returns to block 702. Otherwise, if another panelist DPID 112 is not to be compared, the example program 516 ends.

Figure 8:
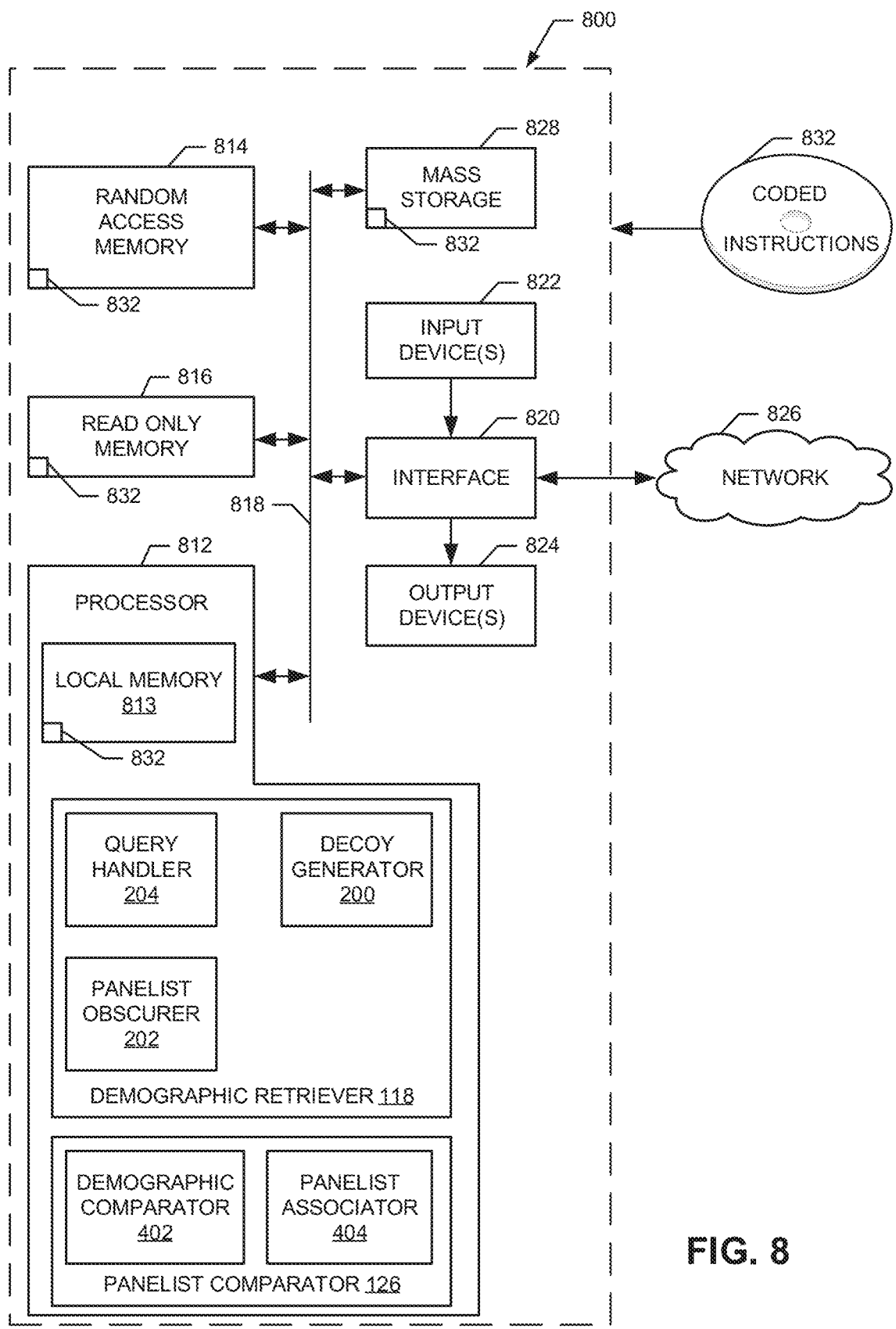
FIG. 8 illustrates an example processor system structured to execute the example instructions represented in FIGS. 5, 6, and/or 7 to implement the example demographic retriever of FIGS. 1 and/or 2, the example decoy generator of FIG. 2, and/or the example panelist comparator of FIGS. 1 and/or 4.

FIG. 8 is a block diagram of an example processor platform 800 is structured to execute the instructions of FIGS. 5, 6, and/or 7 to implement the example demographic retriever 118 of FIGS. 1 and 2, the example decoy generator 200 of FIG. 2, and/or the example panelist comparator 126 of FIGS. 1 and 4. The processor platform 800 can be, for example, a server, a personal computer, a workstation, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer. In the illustrated example, the processor 812 includes the example demographic retriever 118 with the example decoy generator 200, the example panelist obscurer 202, and the example query handler 204. The example processor 812 of the illustrated example also includes the example panelist comparator 126 with the example demographic comparator 402 and the example panelist associator 404.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

Coded instructions 832 of FIGS. 5, 6, and/or 7 may be stored in the mass storage device 828, in the volatile memory 814, in the non-volatile memory 816, and/or on a removable tangible computer readable storage medium such as a CD or DVD.

From the foregoing, it will be appreciated that examples have been disclosed which allow the AME to retrieve demographic information of members of panelist households from database proprietors while protecting the privacy of the members of panelist households. In some examples, computers operate more efficiently by generating a relatively small number of decoy DPIDs using the disclosed PDFs compared to selecting decoy DPIDs at random. For example, to obscure 200 panelist DPIDs with a 50% obscuration target, by randomly selecting decoy DPIDs, the computer would need to generate 14 million decoy DPIDs. In such an example, using the methods, apparatus, and/or articles of manufacture disclosed herein, the computer would need to generate 2000 decoy DPIDs. Additionally, in such examples, by querying the database proprietor using fewer decoy DPIDs, the methods, apparatus, and/or articles of manufacture reduce bandwidth usage. Additionally, it will be appreciated that examples have been disclosed which allow the AME to assign demographic information retrieved from the database proprietors to members of panelist households.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a database proprietor identifier (DPID) extractor to extract a panelist database proprietor identifier from a cookie, the panelist database proprietor identifier associated with credentials used by a panelist to access a website; and
a collector to send a message to a first server of an audience measurement entity, the message including the panelist database proprietor identifier and a panelist identifier associated with the panelist, the panelist database proprietor identifier to be distributed with decoy database proprietor identifiers in a query to a second server at a database proprietor to obtain demographic information, the decoy database proprietor identifiers determined based on a probability density function so that a quantity of the decoy database proprietor identifiers is less than would be used if the decoy database proprietor identifiers were selected by a random selection process, the panelist identifier to be used to associate the panelist with a portion of the demographic information.

2. The apparatus of claim 1, wherein the panelist database proprietor identifier and the decoy database proprietor identifiers are randomly distributed in the query.

3. The apparatus of claim 1, wherein (1) the panelist database proprietor identifier is a first panelist database proprietor identifier, (2) the query further includes a second panelist database proprietor identifier, and (3) the probability density function is based on independent distributions of numbers within the first panelist database proprietor identifier and the second panelist database proprietor identifier.

4. The apparatus of claim 1, wherein (1) the panelist database proprietor identifier is a first panelist database proprietor identifier, (2) the query further includes a second panelist database proprietor identifier, and (3) the probability density function is based on dependent distributions of numbers within the first panelist database proprietor identifier and the second panelist proprietor database identifier.

5. The apparatus of claim 1, wherein the decoy database proprietor identifiers are generated using a confidence level of the probability density function.

6. The apparatus of claim 1, wherein the panelist identifier is provided by the audience measurement entity via a panelist registration website.

7. The apparatus of claim 1, wherein the demographic information includes errors corresponding to ones of the decoy database proprietor identifiers not associated with subscribers to the database proprietor.

8. A method comprising:
extracting a panelist database proprietor identifier from a cookie, the panelist database proprietor identifier associated with credentials used by a panelist to access a website; and
sending a message to a first server of an audience measurement entity, the message including the panelist database proprietor identifier and a panelist identifier associated with the panelist, the panelist database proprietor identifier to be distributed with decoy database proprietor identifiers in a query to a second server at a database proprietor to obtain demographic information, the decoy database proprietor identifiers determined based on a probability density function so that a quantity of the decoy database proprietor identifiers is less than would be used if the decoy database proprietor identifiers were selected by a random selection process, the panelist identifier to be used to associate the panelist with a portion of the demographic information.

9. The method of claim 8, wherein the panelist database proprietor identifier and the decoy database proprietor identifiers are randomly distributed in the query.

10. The method of claim 8, wherein (1) the panelist database proprietor identifier is a first panelist database proprietor identifier, (2) the query further includes a second panelist database proprietor identifier, and (3) the probability density function is based on independent distributions of numbers within the first panelist database proprietor identifier and the second panelist database proprietor identifier.

11. The method of claim 8, wherein (1) the panelist database proprietor identifier is a first panelist database proprietor identifier, (2) the query further includes a second panelist database proprietor identifier, and (3) the probability density function is based on dependent distributions of numbers within the first panelist database proprietor identifier and the second panelist proprietor database identifier.

12. The method of claim 8, wherein the decoy database proprietor identifiers are generated using a confidence level of the probability density function.

13. The method of claim 8, wherein the panelist identifier is provided by the audience measurement entity via a panelist registration website.

14. The method of claim 8, wherein the demographic information includes errors corresponding to ones of the decoy database proprietor identifiers not associated with subscribers to the database proprietor.

15. An apparatus comprising:
means for extracting a panelist database proprietor identifier from a cookie, the panelist database proprietor identifier associated with credentials used by a panelist to access a website; and
means for sending a message to a first server of an audience measurement entity, the message including the panelist database proprietor identifier and a panelist identifier associated with the panelist, the panelist database proprietor identifier to be distributed with decoy database proprietor identifiers in a query to a second server at a database proprietor to obtain demographic information, the decoy database proprietor identifiers determined based on a probability density function so that a quantity of the decoy database proprietor identifiers is less than would be used if the decoy database proprietor identifiers were selected by a random selection process, the panelist identifier to be used to associate the panelist with a portion of the demographic information.

16. The apparatus of claim 15, wherein the panelist database proprietor identifier and the decoy database proprietor identifiers are randomly distributed in the query.

17. The apparatus of claim 15, wherein (1) the panelist database proprietor identifier is a first panelist database proprietor identifier, (2) the query further includes a second panelist database proprietor identifier, and (3) the probability density function is based on independent distributions of numbers within the first panelist database proprietor identifier and the second panelist database proprietor identifier.

18. The apparatus of claim 15, wherein (1) the panelist database proprietor identifier is a first panelist database proprietor identifier, (2) the query further includes a second panelist database proprietor identifier, and (3) the probability density function is based on dependent distributions of numbers within the first panelist database proprietor identifier and the second panelist proprietor database identifier.

19. The apparatus of claim 15, wherein the decoy database proprietor identifiers are generated using a confidence level of the probability density function.

20. The apparatus of claim 15, wherein the demographic information includes errors corresponding to ones of the decoy database proprietor identifiers not associated with subscribers to the database proprietor.

* * * * *